Sept. 8, 1959 R. COLOMBO 2,902,716
METHOD AND DEVICE FOR EXTRUDING TUBES OF
THERMOPLASTIC MATERIALS
Filed March 7, 1957
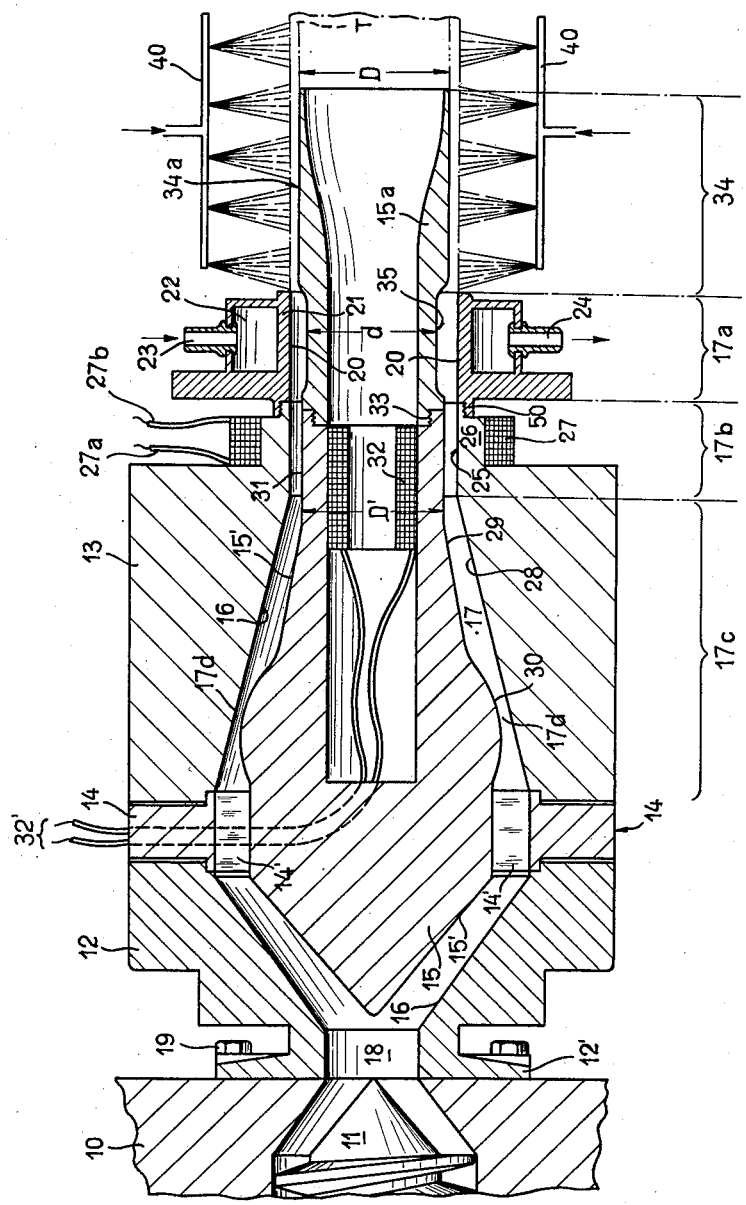

United States Patent Office 2,902,716
Patented Sept. 8, 1959

2,902,716
METHOD AND DEVICE FOR EXTRUDING TUBES OF THERMOPLASTIC MATERIALS

Roberto Colombo, Turin, Italy, assignor to S.A.S. Lavorazione Materie Plastiche (L.M.P.) di M.I. Colombo & C., Turin, Italy Application March 7, 1957, Serial No. 644,555

Claims priority, application Italy March 22, 1956

4 Claims. (Cl. 18—14)

This invention relates to the manufacture of tubes from a thermoplastic material by extrusion, more particularly to extrusion of tubes of a relatively large diameter and thickness.

Tubes of 4–5 cm. in diameter having a thickness of the order of 3–4 mm. already exhibit a rough undulated inner surface at the same time as the outer surface is of a satisfactory finish. The depth of undulations is variable and was found to depend upon the thickness of the tube wall. In any case these undulations impede in use smooth flow of the fluid within the tube, giving raise to pressure losses which are not always acceptable.

The object of this invention is to eliminate these drawbacks.

The invention provides firstly a method of extruding thermoplastic tube, having the main characteristic feature that it comprises the steps of: causing thermoplastic material heated to its softening temperature to travel through a tubular passage, cooling the outer surface of the tube within an end portion of said passage to at least partly set the material forming the said outer surface, the inner tube surface being maintained in a softened condition, and guiding the inner tube surface over a polished support as the tube is further cooled from the outside and heat is dispersed from the tube inside until the material on the inner tube surface is substantially set.

The invention further provides a device for extruding tubes of thermoplastic material, the characteristic features and advantages whereof, as well as all further features of the method will be understood from the following description referring to the accompanying drawing showing in an axial longitudinal cross-sectional view an embodiment of the device for extruding tubes of a circular cross section.

The device as shown chiefly comprises an extrusion head which is fed with softened compressed thermoplastic material from a press 10 for instance of the type having screws 11. The head is made up of two axially aligned portions 12, 13 between which the outer rim 14 of a spider fast with a core 15 is clamped by means of bolts not shown. The two portions 12, 13 form together a hollow box bored through, the bore surface being denoted by 16. The core 15, which is fixedly secured to the blades 14' of the spider, is supported by the box 12, 13 on the axis of the bore 16, so that the bore surface and peripheral surface 15' of the core 15 jointly define a tubular passage 17, the inlet end of which connects at 18 with the press 10. The box portion 12 is provided with a flange 12' by means of which the box can be attached to the press, as by means of bolts 19.

The surfaces 15' and 16 are surfaces of rotation; consequently, every cross-sectional area of the tubular passage 17 is in the form of a circular ring.

For the purposes of this invention the tubular passage 17 can be considered to be made up of three main sections, namely a terminal outlet section 17a, a cylindrical intermediate section 17b and a generally conical intermediate section 17c, the latter extending between the blades 14' on the abovementioned spider and said cylindrical intermediate section 17b.

The section 17a is externally confined by a polished cylindrical surface 20, on a tubular extension 21 on the box portion 13. The extension is relatively thin-walled and is encircled by an annular chamber 22 provided with inlet and outlet nipples respectively 23 and 24 for a coolant, such as water.

The portion 17b is externally confined by a polished cylindrical surface 25 associated with a hub 26 serving as a base for the tubular extension 21. The hub 26 supports and is encircled by heating means 27, for instance an electric resistor, the ends 27a and 27b of which can be connected to a suitable source of current. Since the components 21 and 26 are made of a material which is a good conductor of heat, such as steel, the surface 25 can be heated by the resistance 27, the surface 20 being cooled by the cooling chamber 22.

The portion 17c is externally confined by a conical surface 28 tapering towards the portion 17b and is internally confined by a peripheral surface 29 on the core 15. The peripheral surface 29 is only approximately conical, inasmuch as an annular region 30 on the core is radially enlarged, this resulting in an annular throttled region 17d within the tubular passage 17. The function of this throttled region shall be explained in greater detail hereafter.

The peripheral surface 29 on the core 15 merges in the outlet direction, i.e. towards the right on the drawing into a cylindrical surface 31 radially facing the surface 25 and associated with the intermediate portion 17b of the passage 17. This surface 31 also is polished and can be heated by heating means 32 mounted within the core 15 and surrounded by the surface 31. The means 32 comprises similarly to means 27 a resistor, the in-leads of which 32' extend within one of the wings 14' and issue through the rim 14 for connection with a suitable source of current. The core 15 is made of metal, such as steel. In the embodiment as shown, the core is made up of two sections, its second section being denoted by 15a and connecting with the former section 15 for instance by means of a screw coupling 33. A terminal section 34a of the core section 15a reaches in the direction of extrusion considerably beyond the section 17a of the passage 17 to form by its polished cylindrical peripheral surface 34a a polished support axially aligned with the core, on which the initial portion of a tube T of thermoplastic material issuing from passage 17 can be supported. The diameter D of this cylindrical surface 34a is substantially the same as the diameter D' of the cylindrical annular surface 31.

The outlet section 17a of the passage is internally confined by an annular section 35 of the peripheral surface of the core, the said annular section 35 re-entering radially with respect to the sections 34a and 31 and having a diameter $$d \geq \frac{9D}{10}$$

The section 35, which is likewise highly polished merges gradually at both ends into the adjacent sections 34a and 31. The annular section 35 is substantially in front of the cooled section 20; however, it can reach in the direction of extrusion somewhat beyond the section 17a of the passage 17.

The section 15a of the core is of a good conductor of heat, such as steel and is arranged in heat exchange relationship with the means 32, so that a gradual decrease of temperature in the direction of extrusion occurs throughout the length of the sections 34a and 35. The length of the extension 34 should equal at least ⅔D, and preferably not be less than 2D. The extension is of tubular shape, its wall thickness decreasing in the direction of extrusion, and can advantageously be made of copper, instead of steel, provided its surfaces 34a and 35 are provided with a mechanically strong lining, such as hard chromium.

It is essential for the purposes of the invention for the surfaces confining the outlet section 17a and surface 34a to be of high polish.

Means is arranged about the core extension 34 for causing a coolant to act at least on the section of the tube T extending over the said extension 34. In the construction as shown the above means comprises banks 40 of spray nozzles fed with water. The drawing shows diagrammatically two such banks only, but it is understood that number thereof is not limited and depends upon the desired manner of cooling the tube portion issuing from the passage 17. A plurality of banks each carrying a plurality of nozzles will afford a more intense cooling.

The lower nozzle banks can be replaced by a trough-shaped vat along which the tube T partly immersed into the water in the vat extends, said water being steadily renewed.

All the steps of the method will now be described with reference to the device as described and shown on the drawing.

The press 10 is started and thermoplastic material in a molten, hence softened condition is fed to the inlet section 18 of the passage 17. The core 15 subdivides the material in the form of an annular flow directed towards the clearances between the blades 14' on the supporting spider. As the flow of material proceeds voids might tend to form directly past the blades 14'. In order to avoid this drawback a restriction 17d is provided in the portion 17c of the passage 17, said restriction opposing the flow of material, thereby creating a counter-pressure directed towards the blades 14'. Consequently, the individual threads of material join together under pressure, the structure of the flow past the blades being satisfactorily homogeneous.

The material then travels through the section 17c of the passage 17 and reaches still in a softened condition the sections 17b and 17a which are of particular importance from the standpoint of the invention. In the section 17b the material is moulded substantially to the form of the finished tube T. In this section the material forming the inner and outer surface of the tube advances in contact with surface regions 25 and 31 heated by resistors 27 and 32, respectively. Consequently, considering also the tube thickness, the outer and inner peripheral tube surfaces are maintained at a temperature somewhat above the temperature prevailing within the depth of the tube wall, the material adjacent the said surfaces being in excellent conditions of fluidity.

On issuing under these conditions from the portion 17b, the tube T comes into contact with the cool surface 20 on the extension 21. By supplying water to the cooling chamber 22 the surface 20 quickly subtracts heat from the external layers of the tube T, the layers adjacent the inner surface of the tube being exposed to the heat from the resistance 32, said heat with the heat exchange relationship between the core sections 15, 15a propagating along the section 15a. The external peripheral layers of the tube T therefore quickly set and harden, the internal layers being still in satisfactorily fluid conditions. Since the surface 20 has a specular finish as mentioned above, the external surface of the tube T acquires a high polish.

As hardening of the external layers of the tube T proceeds, the tube exhibits a tendency to radially contract at the portion 17a of the passage 17.

In prior methods such radial shrinking combined with shrinking in an axial direction would lead to the undulations referred to in the preamble. Operation as described above gives the material within the sections 17b and 17a of the tubular passage 17 opportunity to fill the depressions between the ridges of the undulations. Considering the pressure in the section 17c, which pushes the still fluid material towards the outlet section 17a, further considering that in the sections 17b, 17a the internal layers of the tube T are still fluid, it will be seen that the material forming the latter layers flows further than the external layers, preventing the formation of any internal undulations.

However, the problem would at this stage still be practically unsolved, as the question of the hardening of the radially internal layers of the tube T is still open.

According to this invention, hardening of the latter layers is effected under radial pressure thereon by the radially external tube layers, the heat in the radially internal layers being gradually dispersed.

As mentioned above the section 35 of the peripheral surface of the core section 15a radially re-enters, whereby the radial thickness of the section 17a of the tubular passage is inwardly enlarged. This feature first admits of a slight shrinking of the tube upon cooling of its external surface by the surface 20. Secondly, a supplementary clearance is afforded to which a certain quantity of still fluid material can flow, the said material forming the inner surface of the tube T. As the tube T leaves this section 17a, its inner surface travels over a guide surface 34a, the diameter D of which is larger than the diameter d of the surface 35. The already at least partly hardened external layers of the tube T are thus caused to resiliently expand in a radial direction, thereby resiliently compressing the still soft internal layers against the guide surface 34a. Consequently, this procedure specially maintains the radially internal layers of the wall of the tube T in a fluid condition, thereby retarding setting of the latter layers with respect to the radially external layers in order to allow for the quantity of material within the tube wall and successively yieldably compress the radially internal layers by the already hardened external layers, the heat being gradually dispersed from the tube inside both through the core extension 34 and tube thickness.

On considering the tube section T over the guide surface 34a it will be seen that it is subjected from the outside to efficient cooling by the spray nozzles 40. It is remarkable for this cooling action to extend beyond the length of the extension 34 after the inner surface of the tube T has left the guide surface 34a. This gives rise to two effects. Firstly, a temperature gradient is created through the wall depth of the tube T, whereby the heat in the radially internal tube layers is dispersed from the inside to the outside through the tube thickness. Secondly, a temperature gradient is created along the axial length of the extension 34, whereby the free end of this extension is at a temperature below the softening temperature of the material of the tube T. This temperature gradient is set through direct contact of the extension 34 with material cooled from the outside still on the surface 34a as well as through dispersion of heat from the core section 15a towards the tube bore, whence this heat is withdrawn through the unsupported portion of the tube T due to the prolonged cooling of the latter by the spray nozzles situated past the extension 34. This obviates the risk that heat reaching the tube T from the core section 15a may soften the regions of the inner surface of the tube which have just left the guide surface 34a. Concluding, when the tube leaves the extension 34, it has substantially set on its inner surface and throughout its thickness.

It should be pointed out that the tube portion on the extension 34 should be cooled chiefly from the outside instead of from the inside, so that setting gradually proceeds from radially external layers to the radially internal layers of the tube. Otherwise, voids would arise in the tube upon shrinking, which would give rise to undulations in both the inner and outer tube surfaces. For this reason, it is not advisable to provide the core section 15a with cooling means similar to 22, even where construction would admit of this. In order to maintain the free end of this section 15a at a temperature below the softening temperature of the thermoplastic material employed, the axial length of this section and extent of cooling from the outside will be calculated to afford the desired results. Therefore, the section 15a as shown is rechangeable through the threaded connection 33.

On the other hand it is pointed out that, as the tube leaves the section 17a of the tubular passage, its radially external layers should have set to a great extent, and setting thereof cannot be entrusted to the nozzles 40, unless appearance of the outer surface of the tube T is of no special importance. However, since this case is highly improbable, the axial length of the surface 20 and extent of cooling by means of the chamber 22 should constantly be such as to harden the outer surface of the tube before the tube leaves the section 17a of the tubular passage 17. In order to facilitate attainment of this object, the extension 21 on the box 12, 13 is likewise shown to be rechangeable by means of a threaded connection 50.

When the wall of the tube T is of considerable thickness, the depressed portion 35 as well as the heating means 27 can be dispensed with. The tube thickness is then sufficient to allow flow of the fluid internal layers upon hardening of the radially external layers without requiring a radial inward enlargement of the thickness of the portion 17a. On the other hand, the considerable mass of the material forming the tube thickness maintains at the section 17b sufficient fluidity for its outer surface to acquire a high polish in contact with the surface 20.

In describing the device as shown the constructional details within reach of any expert have been omitted, since it will be obvious that the device can be carried out in various manner according to circumstances and desired product. For instance, in order to manufacture tubes of a cross-section other than circular, the cross sectional shape of the tubular passage 17 or parts thereof, such as 17a and 17b, and of the guide surface 34a will be modified accordingly. The core section 15 can be internally finned to improve heat dispersion and set up a more favourable temperature gradient along the axial length of this component. The radial expansion 30 of the surface 29 of the core 17 is not strictly essential. For instance, when the thermoplastic material employed is not highly fluid and the tube T is of relatively small thickness, the cross sectional area of the sections 17a and 17b of the tubular passage may be sufficient to create alone in the section 17c a counterpressure of a value as would otherwise require provision of the abovementioned enlargement 30 and restriction 17b.

Further modifications can be made without departing from the scope of the appended claims.

What I claim is:

1. In a thermoplastic tube extrusion head having a tubular shaping passage therethrough confined by a radially inner and a radially outer cylindrical surface, means encircling a longitudinally intermediate section of the passage and means encircled by the said intermediate section of the passage for heating said intermediate section from the outside and inside respectively, means surrounding an extrusion end section of the passage for cooling a section of the outer cylindrical surface confining the extrusion end section of the passage, a guide member of a heat conductive material having a polished outer cylindrical surface providing a heat conductive extension of the said radially inner cylindrical surface, said member axially protruding from the extrusion end of the passage over a substantial length, and a coolant spray means surrounding the member, thereby to cool from outside a section of the thermoplastic tube when supported from said member the portion of said radially inner cylindrical surface opposite said cooling means being of reduced diameter and being polished.

2. A device for extruding tubes of thermoplastic material comprising in combination a box having a through bore, a core supported by the box within said bore, the peripheral core surface and the bore surface jointly confining a tubular passage having an inlet section adapted to be fed from a press and an outlet section, cooling means supported by the box around said outlet section for cooling a section of the bore surface associated with said outlet section, heating means mounted in the core at an intermediate section of the tubular passage substantially adjacent said outlet section for heating a section of the core surface associated with said intermediate section of the passage, an extension on the core extending in the direction of extrusion substantially beyond said outlet section, said extension being heated from the core and having a polished peripheral surface adapted to support and guide a tube of thermoplastic material issuing from said tubular passage, and coolant spray means arranged about the extension to spray a liquid coolant over the outer surface of the tube section supported on the extension, the portion of said core opposite said cooling means being of reduced diameter and being polished.

3. A device as defined in claim 2, in which said extension is of tubular shape, and its wall thickness decreases towards its end extending in the direction of extrusion.

4. A device as defined in claim 2, in which said extension is tubular and of circular cross section and is in heat exchange relationship with said heating means and has an axial length equalling at least one and a half times its outer diameter.

References Cited in the file of this patent
UNITED STATES PATENTS

| | | |
|---|---|---|
| 1,133,610 | Bleecker | Mar. 30, 1915 |
| 1,455,946 | Wester | May 22, 1923 |
| 1,740,029 | Moomy | Dec. 17, 1929 |
| 1,770,396 | Fuller et al. | July 15, 1930 |
| 2,144,213 | Bassett et al. | Jan. 17, 1939 |
| 2,519,375 | Jargstorff et al. | Aug. 22, 1950 |
| 2,626,427 | Brown | Jan. 27, 1953 |